G. W. LANE.
Dividers.
No. 108,799.  Patented Nov. 1, 1870.
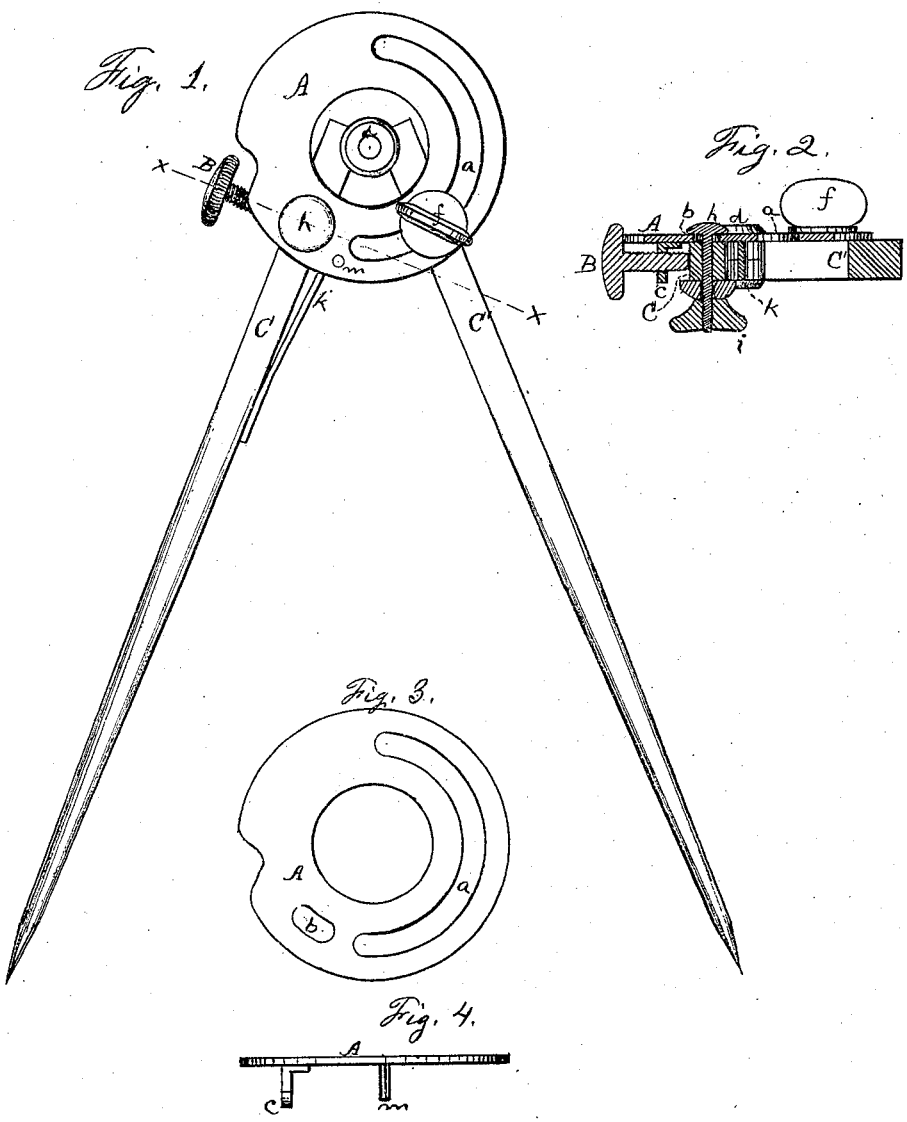

United States Patent Office.

GEORGE W. LANE, OF PLANTSVILLE, CONNECTICUT, ASSIGNOR TO himself and ELISHA R. NEWELL, OF SAME PLACE.

Letters Patent No. 108,799, dated November 1, 1870.

IMPROVEMENT IN DIVIDERS AND CALIPERS.

The Schedule referred to in these Letters Patent and making part of the same.

I, GEORGE W. LANE, of Plantsville, in the county of Hartford and State of Connecticut, have invented a new and useful Improvement in Dividers and Calipers, of which the following is a specification.

My invention consists in the employment of a slotted ring or disk arranged around the joint of an ordinary divider or caliper, and sunk into recesses in the sides of the legs of said instrument, and of the peculiar arrangement of firmly setting the spring leg of the same, all as hereinafter more fully described.

In the accompanying drawing—

Figure 1 is a side elevation of my invention;

Figure 2, a section of the same on line $x\ x$;

Figure 3, a side view of the disk as removed from the dividers; and

Figure 4, an edge view of the same.

A designates the disk, which is provided with a circular slot, $a$, and a similar but shorter slot, $b$.

A stud or arm, $c$, is formed on or riveted to the disk A, in which stud is a set-screw, B.

The disk A has a circular opening in its center sufficiently large to admit the whole joint of the dividers, thus forming the disk A into a flat-slotted ring, which is sunk into the divider-legs C C' near the joint $d$, in such manner that the joint $d$ is in the center of the disk A.

A thumb-screw, $f$, passes through the slot $a$ into the leg C'.

A bolt, $h$, passes through the slot $b$ and leg C, and is provided with a thumb-nut, $i$.

The usual spring $k$ is secured to the leg C, while a pin, $m$, or any proper projection, is secured to the disk A in such manner as to come in contact with and confine the spring $k$.

For an ordinary adjustment of the dividers the thumb-screw $f$ is loosened, which will allow the legs C C' to open or close to the desired point, when they are secured by tightening the screw $f$.

For a more particular or finer adjustment the legs are set at nearly the desired point by the thumb-screw $f$, when the thumb-nut $i$ is loosened, and by turning the screw B against the leg C, the bolt $h$ being free to move in the short slot $b$, the spring $k$ is compressed until the legs C C' are adjusted to the desired point, when the thumb-nut $i$ is again tightened, which firmly secures both legs C C' in their place beyond any probability of displacement by use.

In ordinary dividers and calipers, which are adjusted by a spring, no arrangement is made for securing the spring leg aside from the rigidity of the spring, and which is liable to yield, thus varying the distances in spacing or making irregular lines in describing a circle on a rough surface.

By my invention the above objection is entirely overcome. The disk, being circular, gives superior strength to the device, and prevents the legs from twisting, as is often the case when the usual curved arm is used. The disk being arranged at the end around the joint presents a very convenient handle for operating the instrument, and thus removes the liability of compressing the legs by griping their up per ends for use.

I do not claim the circular slot and set-screw for adjusting divider or caliper-legs; neither do I claim a sheet-metal divider or caliper-leg with a circular disk formed on its joint end.

I claim as my invention—

The combination of the disk A, slots $a\ b$, thumb or set-screws $f$ and B, bolt $h$, thumb-nut $i$, spring $k$, pin $m$, and divider or caliper-legs C C', all substantially as described, whereby the spring leg, when adjusted, may be firmly fixed in place.

GEORGE W. LANE.

Witnesses:
SIMEON H. NORTON,
JOSEPH K. SHEPARD.